United States Patent [19]
Goldberg et al.

[11] 3,993,566
[45] Nov. 23, 1976

[54] REVERSE OSMOSIS APPARATUS

[75] Inventors: Bruce S. Goldberg, Clifton; John T. Loft, Summit, both of N.J.

[73] Assignee: Amerace Corporation, New York, N.Y.

[22] Filed: Jan. 8, 1975

[21] Appl. No.: 539,510

[52] U.S. Cl. .................. 210/433 M; 210/494 M; 210/500 M
[51] Int. Cl.² .................................. B01D 31/00
[58] Field of Search ............ 210/23, 321, 323, 490, 210/491, 500 M, 494 M, 433 M

[56] References Cited
UNITED STATES PATENTS

| | | | |
|---|---|---|---|
| 3,401,798 | 9/1968 | Hyrop | 210/321 |
| 3,457,170 | 7/1969 | Havens | 210/23 |
| 3,494,468 | 2/1970 | Kohl | 210/321 |
| 3,508,994 | 4/1970 | Hyrop | 210/321 X |
| 3,542,204 | 11/1970 | Clark | 210/321 |
| 3,556,305 | 1/1971 | Shorr | 210/490 |
| 3,581,900 | 6/1971 | Clark | 210/321 |
| 3,615,024 | 10/1971 | Michaels | 210/490 |
| 3,645,890 | 2/1972 | Lukach et al. | 210/23 |
| 3,701,431 | 10/1972 | Brown et al. | 210/321 |
| 3,763,055 | 10/1973 | White et al. | 260/2.5 M |
| 3,813,334 | 5/1974 | Bray | 210/494 X |
| 3,855,133 | 12/1974 | Roehsler | 210/490 |
| 3,862,030 | 1/1975 | Goldberg | 210/500 M X |
| 3,878,104 | 4/1975 | Guerrero | 210/323 |
| 3,894,166 | 7/1975 | Brown et al. | 210/500 M |

*Primary Examiner*—Frank A. Spear, Jr.
*Attorney, Agent, or Firm*—S. Michael Bender; Gregory J. Battersby

[57] ABSTRACT

A reverse osmosis module comprising a semipermeable membrane, a porous membrane support structure, and a porous backing member having at least a pair of opposed surfaces and including a plurality of longitudinally extending channels, said porous backing member being mounted relative to said porous membrane support structure in such a manner that fluid passing through said membrane passes through said porous support structure and is adapted to enter said channels in said porous backing member.

12 Claims, 5 Drawing Figures

REVERSE OSMOSIS APPARATUS

BACKGROUND OF THE INVENTION

This invention relates generally to reverse osmosis apparatus and, more particularly, relates to the employment of a channelized porous backing member in a reverse osmosis module to improve the efficiency and output of the module.

The present invention is particularly applicable to reverse osmosis systems used for removing or separating dissolved solids from an aqueous solution such as, for example, in desalinizing seawater. Reverse osmosis systems of this type pass seawater, under pressure, through a semipermeable membrane and recover the then desalinized water on the opposite side of said membrane. The salt crystals, having been separated from the seawater, remain on the influent side of the membrane. In order to effect desalinization in this manner, sufficient pressure must be applied to overcome the osmotic pressure of the system, which, in the case of seawater, generally ranges between 300 and 400 p.s.i.g. Commercial operation of such a system requires the passage of large volumes of water through the membrane and, accordingly, driving pressures in excess of 1000 p.s.i.g. are frequently employed.

Reverse osmosis modules heretofore used generally comprise a semipermeable membrane carried by a previous membrane support member which, in turn, contacts or is additionally supported by a backing member adapted to permit the passage of desalinized water therethrough, and furthermore to direct the water permeate to a collection means. Depending upon the system employed, a solid base, such as a metallic plate, may be added for further support.

In known reverse osmosis systems of the "spiral wound" configuration, these components (absent a metallic supporting plate) are wrapped, in spiral form, about a perforated center tube through which the desalinized water or permeate is collected for eventual distribution.

Since the semipermeable membrane is usually only about 0.0025 to about 0.001 inches thick, it is extremely fragile and thus, must be supported by a suitable membrane support structure. This membrane support structure should be of sufficient strength to support the membrane from collapsing under hydraulic pressures in excess of 1000 p.s.i.g., yet still allow the desalinized permeate to pass through to the porous backing member which not only provides further support for the delicate membrane, but serves to direct the permeate to a suitable collection means.

Due to the relatively high pressures under which reverse osmosis system must operate, it is important that the backing member component be fabricated of a material having sufficient strength to resist compacting under the high pressures, since any such compaction of this material would result in an increased back pressure reflected across the membrane interface. Further, in those instances where spiral wound systems are employed, the thickness of the backing material should ideally be less than 0.015 inches to avoid undue bulkiness of the module and consequent reduction in efficiency. Additionally, the backing material should be porous enough to readily permit the passage of water therethrough at a rate at least equal to the rate of flow of such fluid through the semipermeable membrane. In order to accomplish this at maximum efficiency, the porous backing member should be capable of carrying the permeate away from the membrane preferably in a direction normal to the direction of the fluid passing through the membrane.

Heretofore numerous backing materials have been investigated and employed, each of which, however, has been found to suffer from one drawback or another. Among those tried and rejected include materials fabricated from glass or plastic beads; screen materials constructed from nylon, aluminum, or plastic; and woven brass cloth.

More recently, woven fabrics have become increasingly popular due to the large open areas between the individual weave strands and thus the relatively high porosity of these materials. One such fabric is a woven Dacron polyester tricot. Since, as mentioned above, the tricot backing material is normally subjected to high contact pressures, it has been found that even this material undergoes a marked rearrangement of the individual fibers leading to a corresponding increase in flow resistance. To prevent this rearrangement, attempts have been made to impregnate the tricot with polymeric materials such as polystyrenes, polycarbonates, phenolics, epoxies and so on. For example, a melamine formaldehyde resin has been employed as an impregnating agent and has been found to give the tricot improved stiffness and consequently increased pressure resistance. The use of this material in reverse osmosis applications is more fully described in U.S. Pat. No. 3,813,334 as well as in the Office of Saline Water Research and Development Progress Report No. 702.

While the resin impregnated tricot is currently being commercially utilized, there are certain disadvantages inherent in the use of this backing material in systems where significant volumes of fluid are being processed. Resin impregnated tricot is relatively expensive and it has only limited water carrying capability, particularly in a direction normal to the direction of fluid passing through the membrane and the tricot. This correspondingly increases the back pressure relative to the semipermeable membrane and thus, prevents the module from operating at maximum efficiency. Further, the resin impregnated tricot fails to offer a uniformly smooth surface devoid of irregularities and, as such, may result in premature module failure due to torn or punctured membranes.

Against the foregoing background, it is a primary objective of the present invention to provide a reverse osmosis membrane module comprising an improved porous backing member.

It is another object of this invention to provide a reverse osmosis membrane module including a porous backing member exhibiting greatly improved water carrying capabilities particularly in a direction normal to the direction of the fluid passing through the module membrane.

It is an additional object of the present invention to provide a reverse osmosis membrane module, the cost of which is lower than that of modules heretofore used.

It is still another object of the invention to produce a reverse osmosis membrane module which is less subject to premature failure than modules heretofore used.

SUMMARY OF THE INVENTION

To the accomplishment of the foregoing objects and advantages, the present invention briefly comprises a reverse osmosis membrane system including a semipermeable membrane carried by a porous support material such as a woven Dacron polyester fabric. A semirigid, porous backing member, containing a relatively flat, smooth surface on one side thereof, and a series of channels formed within the surface on another oppositely opposed side thereof is disposed with its flat, smooth surface juxtaposed relative to the membrane support material in such a manner that the channels contained within the surface on the oppositely disposed side readily serve to guide and carry the desalinized permeate passing through the porous backing member to a suitable collection and distribution means with minimal back pressure.

The module may be constructed employing a single semipermeable membrane with its support material and a single backing member. A metallic or other rigid plate might be employed for additional support. Alternatively, more than one membrane and associated membrane support may be placed in a sandwich configuration about a common backing member. In a third embodiment, the aforementioned sandwich configuration is wrapped about a porous center tube to form a spiral wound module.

BRIEF DESCRIPTION OF THE DRAWINGS

The foregoing and still other objects and advantages of the present invention will be more apparent from the following detailed explanation of the invention in connection with the accompanying drawings wherein.

DESCRIPTION OF THE PREFERRED EMBODIMENTS

Figure 2:
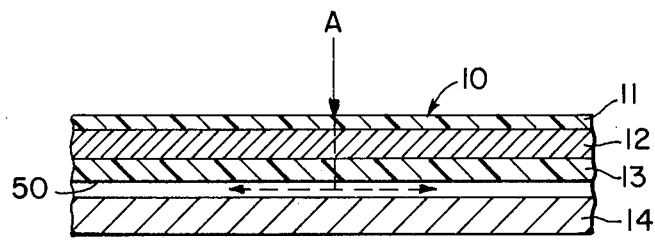
FIG. 2 is a sectional view taken along line 2—2 of FIG. 1.
Figure 1:
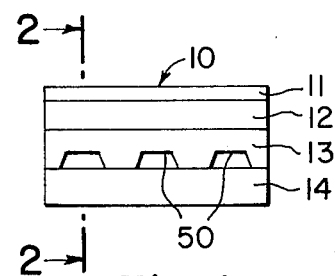
FIG. 1 schematically illustrates in end view one preferred form of the reverse osmosis membrane module according to the present invention.

Referring now to FIGS. 1 and 2, there is shown one preferred form of a reverse osmosis membrane module 10 comprising a semipermeable membrane 11 mounted on a support member 12 which, in turn, is mounted on a backing member 13.

The semipermeable membrane 11 preferably comprises a conventional cellulose acetate membrane of the "Loeb-type" as more completely described, for example, in U.S. Pat. Nos. 3,364,288, 3,344,214, 3,133,137 and 3,133,132. As is well known, such "Loeb" membranes are capable of filtering out salts and other dissolved solids from an aqueous or saline solution by the process of reverse osmosis, i.e., under the effect of applied pressure in excess of the osmotic pressure of the system determined by the pressure of the pure product water toward the aqueous saline solution, the water from the solution may be made to flow through the "Loeb" membrane into a fresh water reservoir leaving the dissolved salts on the other side of the membrane. It will be appreciated that the structural details of the membrane 11 form no part of the present invention, and that other known membranes capable of reverse osmosis separations may be used as well.

Since the fragile, ultra-thin semipermeable membrane 11 is in direct contact with one surface of the support member 12, member 11 would be liable to puncture if the surface of the member 12 contained any irregularities. Accordingly, the support member 12 comprises a relatively smooth surfaced sheet-like member devoid of any rough or jagged edges. Additionally, support member 12 must be capable of permitting the passage of an aqueous fluid therethrough, preferably in a direction normal to its plane, as indicated by arrow A in FIG. 2, with minimal pressure drop, and yet be of sufficient strength to support membrane 11 relative to the backing member 13 at operating pressures from 400 to and in excess of 1000 p.s.i.g. A suitable support member 12, capable of meeting the foregoing requirements may be constructed from phenol formaldehyde impregnated paper, filter paper, cloth woven from nylon or from a felt type fiber, although the use of Dacron polyester impregnated with a water based phenol formaldehyde is preferred. The support member 12 may be adhesively bonded to semipermeable membrane 11 by using a water soluble adhesive such as a latex.

As shown in FIGS. 1 and 2, the upper surface of the porous backing member 13 coextensively underlies the membrane 11 and its associated support member 12 with the upper, relatively flat, smooth surface 53 (see FIG. 3) of the backing member being juxtaposed relative to the membrane support material. In accordance with the present invention, there is formed, within the surface 51 on the opposed other or bottom side of the backing member 13, a series of spaced, longitudinally extending, substantially parallel channels 50 as is more clearly shown in FIG. 3. The sidewalls 52 of each channel 50 intercept surface 51 to form a corresponding series of spaced, longitudinally extending, substantially parallel ribs defining substantially flat bearing surface portions 54 between adjacent channels.

When employing a backing member having a thickness measured from surface 51 to surface 53, ranging from about 0.011 to about 0.015 inches, for example, the depth of each channel 50 measured with respect to surface 51 may range from about 0.005 to about 0.010 inches with a depth of about .006 inches being particularly preferred. Similarly, the channels may range between about 0.010 and about 0.020 inches in width measured at the surface 51 with a width of about .018 inches being particularly preferred. As further indicated in FIG. 3, each sidewall 52 extends relative to the bottom surface of each channel 50 preferably at an angle of about 110°. This arrangement has been found to decrease the flow resistance of aqueous fluid, for example, along the channels. The width of the substantially flat bearing surface portions between adjacent channels should be as narrow as possible to permit the greatest volume of water to pass through the channels, yet be of sufficient width to provide adequate bearing support for the membrane and membrane support structure. In this regard, it has been found that bearing surface widths of about 0.010 inches have proved particularly satisfactory.

In accordance with another feature of the present invention, the backing member 13 is fabricated from a microporous semirigid sheet of material of the type fully disclosed in U.S. Patent application, Ser. No. 314,654, filed Dec. 13, 1972 in the name of Bruce S. Goldberg and assigned to the same assignee as the present application said patent application having isicantly more porous than impregnated tricot yet, due to the relative size of its pores, affords greater structural support to the membrane 11 and support member 12 as well as providing greater wicking and wettability. For these reasons, the present porous backing material 13 displays superior water carrying properties allowing the system to operate at peak efficiencies with little or no back pressure.

Having thus described the invention with particular reference to the preferred forms thereof, it will be obvious that various changes and modifications may be made therein without departing from the spirit and scope of the invention as defined in the appended claims.

What is claimed is:

1. Apparatus for use in a reverse osmosis system comprising in combination, at least one semipermeable membrane, at least one porous support member for supporting said semipermeable membrane, and at least one microporous backing member for supporting said semipermeable membrane and said support member, said microporous backing member comprising a polymeric resinous matrix having particles of inorganic filler material dispersed throughout said matrix and a network of micropores formed therein, said dispersed filler being present in said member in an amount by weight of at least about 50%, said backing member having a porosity of at least about 50%, said backing member having at least a pair of opposed sides and including a plurality of channels extending longitudinally with respect to a normal to at least one of said opposed sides, said semipermeable membrane being mounted upon said support member, and said support member being mounted relative to said microporous backing member such that fluid passing through said semipermeable membrane under pressure exceeding the osmotic pressure of said system is adapted to pass through said porous support member and enter said channels in said backing member and flow longitudinally along said channels in a direction substantially normal to the direction of said fluid passing through said semipermeable membrane.

2. The apparatus of claim 1 wherein said plurality of longitudinally extending channels is disposed on one of said opposed sides of said microporous backing member.

3. The apparatus of claim 2 wherein the other of said opposed sides is substantially flat and said microporous backing member is mounted relative to said support member with its said substantially flat other opposed side being juxtaposed with respect to said support member whereby said fluid passing through said porous support member passes through said substantially flat other opposed side of said microporous backing member before entering said channels.

4. The apparatus of claim 3 wherein an impervious base member is mounted in juxtaposition with respect to the one of said opposed sides of said microporous backing member in which said plurality of longitudinally extending channels is disposed.

5. The apparatus of claim 2 wherein each of said channels includes a substantially flat bottom and two opposed sidewalls extending outwardly therefrom at an angle greater than 90° relative to said bottom.

6. The apparatus of claim 5 wherein the thickness of the said microporous backing member measured between the opposed sides thereof is between about 0.011 inches and about 0.015 inches and the depth of said channels is between about 0.005 inches and about 0.010 inches.

7. The apparatus of claim 6 wherein the width of said channels measured at the side of the backing member in which said plurality of channels is disposed ranges between about 0.010 inches and about 0.020 inches.

8. The apparatus of claim 7 wherein the channels are spaced apart laterally on the side of the backing member in which said plurality of channels is disposed to define a plurality of flat bearing surfaces each having a width of about 0.01 inches.

9. The apparatus of claim 1 wherein said polymeric resinous matrix is polyvinyl chloride and said dispersed inorganic filler is silica.

10. The apparatus of claim 1 wherein the size distribution of said pores varies non-uniformly through the range of about 0.01 microns to about 100 microns.

11. The apparatus of claim 1 wherein a first semipermeable membrane and a first porous support member are positioned relative to said one opposed side of said microporous backing member and a second semipermeable membrane and a second support structure are positioned relative to said other opposed side of said microporous backing member.

12. The apparatus of claim 11 wherein said at least one microporous backing member is semi-rigid and, wherein said first and second semipermeable membranes, said first and second porous support members and said at least one microporous backing member are wound about a perforated tube to form a spiral wound reverse osmosis module.

* * * * * sued on Jan. 21, 1975 as U.S. Pat. No. 3,862,030. The aforementioned application Ser. No. 314,654 is hereby incorporated herein by this reference and made part of this disclosure.

As described in the copending Goldberg application, Ser. No. 314,654, such microporous material comprises a polymeric resinous matrix (e.g., polyvinyl chloride) having particles of an inorganic filler material (e.g., silica) dispersed throughout the resinous matrix and a network of micropores formed between adjacent particles of the dispersed filler, between particles of dispersed filler and the resinous matrix, and in the resinous matrix itself, with the size distribution of the micropores ranging from about 0.01 microns to about 100 microns. Due to the presence of such micropores and their relatively wide pore size distribution, the porosity of the backing material is extremely high, ranging from about 50% to about 70%, and further due to the inherent physical properties of the polymeric resinous material, the resulting microporous sheet has excellent dimensional stability and strength.

In accordance with the disclosure in the aformentioned Goldberg application, Ser. No. 314,654, the microporous backing member material may be fabricated in semirigid sheet form of desired thickness by mixing together suitable quantities of a finely divided polymeric resin, a finely divided inorganic filler, a solvent (e.g., cyclohexanone), and a nonsolvent (e.g., water), and extruding the mixture to form a substantially planar sheet which next may be fed into an aqueous bath to leech out the solvent, and then finally removed from the bath and dried in an air oven to remove all traces of moisture.

Figure 3:
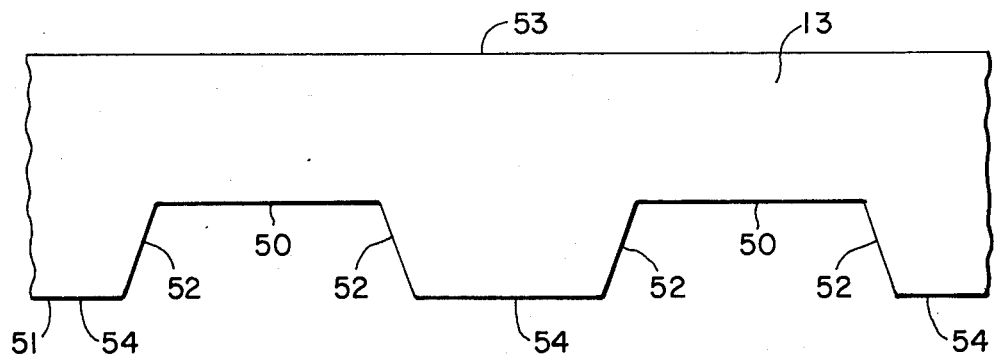
FIG. 3 is a greatly enlarged end view of a portion of the backing member in the reverse osmosis module depicted in FIG. 1.

Thus, in preparing a suitable porous backing member for use with the present invention, the same procedure may be followed, it being necessary to merely extrude the mixture through an extruding or forming apparatus or die having a shape complementary to the shape shown in FIG. 3 hereof.

Preferably, the membrane 11 and its associated support structure 12 are bonded to the relatively flat, smooth side 53 of the backing member 13. This may be suitably accomplished, for example, by employing a latex adhesive to bond the peripheral edge portions of support structure 12 to the corresponding peripheral edge portions of backing member 13.

Referring again to FIGS. 1 and 2, an impervious member 14 may be employed as a further support for membrane 11, its associated support material 12, and the backing member 13.

Base member 14 should be of such a construction as to lend additional support and rigidity to the apparatus and to prevent the passage of water therethrough. As such, a metallic plate of sizeable thickness is preferred.

In operation, an aqueous fluid to be treated such as seawater, for example, is introduced on the membrane side of the apparatus and pressure is applied in the direction of arrow A (see FIG. 1) to urge the seawater through the membrane 11 in the direction of arrow A. Since this membrane is semipermeable, the pressure applied must exceed the osmotic pressure of the desalinized water which, as mentioned, typically requires the application of pressure in excess of between 300 and 400 p.s.i.g. As such, pressures in excess of 1000 p.s.i.g. may be and are commonly employed. Under these conditions, semipermeable membrane 11 will reject the salt molecules dissolved in the water and will permit only desalinized water to pass therethrough. this desalinized water product, or permeate, passes through support member 12, the upper side 53 of porous backing member 13, and eventually enters the channels 50. Due to the impervious nature of the underlying base member 14, the desalinized water product or permeate is caused to flow longitudinally along and within channels 50 to a suitable collection or distribution means (not shown), that is, substantially normal to the direction of the fluid passing through the membrane 11 and its associated support member 12.

Figure 5:
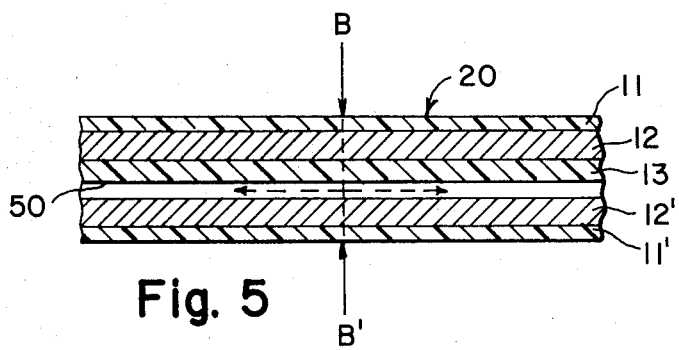
FIG. 5 is a sectional view taken along line 5—5 of FIG. 4.
Figure 4:
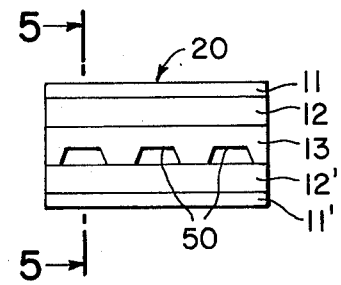
FIG. 4 schematically illustrates in end view an alternatively preferred form of the reverse osmosis membrane module of the present invention.

Turning now to FIGS. 4 and 5 there is illustrated an alternatively preferred embodiment of the present invention, specifically a reverse osmosis membrane apparatus comprising two sets of membranes 11 and 11', and support members 12 and 12', positioned in a sandwich construction about a single or common backing member 13 with channels 50 contained on one side 54 thereof. In the operation of this embodiment, the seawater to be desalinized may be introduced on either side of apparatus 10 under pressure applied in the direction of arrows B and $B^1$. As was the case in the embodiment depicted in FIGS. 1 and 2, when the pressure applied exceeds the osmotic pressure of the system, separation of the salt particles from the seawater is effected by the two membranes 11, 11' and the desalinized permeate passes through membranes 11, 11', support members 12, 12', whereupon the permeate enters the channels 50 in the backing member 13. That is, the permeate traveling in the direction of arrow $B^1$ enters from the channeled side of the backing member and is directed along channels 50 to a suitable collection and distribution means (not shown) due to the effect of pressure exerted by the oppositely flowing permeate entering the channels through the porous backing member 13 along the direction indicated by arrow B. Similarly, the permeate flowing along the direction of arrow B passes through the porous backing member from its flat, smooth side 53, enters the channels 50 and, due to the pressure of the permeate flowing in the opposite direction, i.e., along the direction of arrow $B^1$, is urged to flow longitudinally along the channels 50 to the collection and distribution means (not shown).

The embodiment of FIGS. 4 and 5 may obviously be further modified to include two separate backing members 13 mounted in juxtaposition with one another, with each of their flat bearing surface portions 54 in direct contact with one another respectively, and with each of their corresponding channels 50 being in direct alignment with one another, respectively.

It will be understood, of course, that at least one porous backing member 13 may be employed in spiral wound reverse osmosis systems and other systems of like design wherein either the configuration of the FIGS. 1 and 2, or more preferably, the sandwich configuration of FIGS. 4 and 5 is spirally wrapped about a perforated center tube in order to increase the output and efficiency of the system. Such a spiral wound configuration is more fully described in the aforementioned U.S. Pat. No. 3,813,334 and Office of Saline Water Research and Development Report No. 702, where impregnated tricot is employed as the backing member material.

The porous backing material 13 of the present invention has been found to exhibit a marked improvement over the backing materials heretofore employed in reverse osmosis systems, particularly over impregnated tricot. The present porous backing material 13 is signif-